United States Patent Office 2,773,917
Patented Dec. 11, 1956

2,773,917

DEMETHYLATION OVER CHROMIA OR MOLYBDENA CATALYSTS

Harry L. Coonradt, Woodbury, and Wilbur K. Leaman, Pitman, N. J., assignors to Socony Mobil Oil Company, Inc., a corporation of New York No Drawing. Application September 16, 1952, Serial No. 309,929

8 Claims. (Cl. 260—672)

This invention relates to the demethylation of methyl-substituted organic compounds. It is more particularly concerned with the catalytic removal of one or more methyl radicals from a methyl-substituted benzenoid hydrocarbon, in the presence of a catalyst which is novel for such reactions.

In many commercial operations, such as petroleum refining, coal tar distillation, and the like, there are produced methylbenzenes which may not be in demand when produced. As those skilled in the art will recognize, the demand for toluene, benzene, xylene, and other benzenoid hydrocarbons varies from time to time. Accordingly, it is desirable to be able to convert a hydrocarbon for which there is no demand into hydrocarbons which are readily marketable. For example, large quantities of toluene may be produced at a time when benzene is demanded. This demand can be satisfied by demethylating the toluene. Likewise, large amounts of undesired xylene may be obtained when toluene and/or benzene are demanded. A selective demethylation process will permit the conversion to the desired hydrocarbon.

As is well known to those familiar with the art, the demethylation of methylbenzenes, as opposed to dealkylation (removal of an alkyl radical of at least two carbon atoms has been difficult to achieve. Demethylation processes have been proposed in which activated alumina catalysts are used. Thus, in British Patent No. 637,595, it has been proposed to demethylate methylbenzenes in the presence of a catalyst consisting of activated alumina or of activated alumina and hydrogen chloride. Insofar as is now known, however, demethylation in the presence of chromia or molybdena catalysts has not been heretofore proposed.

It has now been found that methyl-substituted benzenes can be demethylated to benzenoid hydrocarbons having fewer methyl radicals in the presence of chromia or molybdena, as the catalyst, by a process which is simple and commercially feasible. It has been discovered that methyl-substituted benzenoid hydrocarbons can be demethylated at elevated temperatures, in the presence of a chromia catalyst, or of a molybdena catalyst, and of hydrogen under pressure.

Accordingly, it is an object of the present invention to provide a process for demethylating methyl-substituted benzenoid hydrocarbons. Another object is to provide a catalytic method for demethylating methyl-substituted benzenoid hydrocarbons to produce benzenoid hydrocarbons containing fewer methyl radicals. A specific object is to provide a method for converting methyl-substituted benzenes into other useful benzenoid hydrocarbons by contacting the methyl-substituted benzenes with a chromia or a molybdena catalyst in the presence of hydrogen gas. A more specific object is to provide a process for demethylating toluene, xylene, and like hydrocarbons in the presence of hydrogen and a chromia or a molybdena catalyst. Other objects and advantages of the present invention will become apparent to those skilled in the art, from the following detailed description.

Broadly stated, the present invention provides a process for demethylating methyl-substituted benzenes into other benzenoid hydrocarbons, which comprises contacting the methyl-substituted benzene with a catalyst comprising chromia or molybdena, at a temperature of between about 1000° F. and about 1150° F., for a contact time of between about 40 seconds and about 1000 seconds, and in the presence of hydrogen gas under superatmospheric pressures.

The process of this invention is applicable to the demethylation of any methyl-substituted benzene, including monomethyl-substituted and polymethyl-substituted benzenes. In the case of demethylating polymethyl-substituted benzenes, one or more methyl groups can be removed. For example, xylene can be demethylated to produce benzene, or benzene and toluene. The present process is also applicable to charge stocks containing methyl-substituted benzenes in admixture with other hydrocarbons, such as, for example, highly-aromatic petroleum fractions. Nonlimiting examples of the methylbenzenes contemplated herein are toluene, o-xylene, m-xylene, p-xylene, hemimellitene, pseudocumene, mesitylene, prehnitene, durene, and pentamethylbenzene; and mixtures of hydrocarbons containing one or more of these compounds.

The catalysts utilizable herein are chromia or molybdena. The process of this invention is operable with chromia or molybdena alone. In practice, however, it is usually preferred that the catalyst be composited with a suitable carrier. Any of the well known catalyst supports are suitable herein, including the oxides of aluminum, zirconium, zinc, magnesium, titanium, silicon, and thorium. Catalysts comprising composites of chromia and alumina or of molybdena and alumina, are especially preferred. The term "composite" includes any of the usual associations of two or more materials, such as metal oxides, commonly used to produce catalysts, including impregnated catalysts, coprecipitated catalysts, cogelled catalysts, and the like. The chromia-alumina catalysts, wherein the alumina is present as a support, generally contain between about 4 weight percent and about 12 weight percent of chromia, based on the weight of the finished catalyst. Preferably, such a catalyst contains between about 6 and about 10 weight percent of chromia. The cogelled chromia-alumina catalysts, on the other hand, contain between about 18 mole percent and about 80 mole percent chromia, and preferably between about 18 and about 40 mole percent chromia. The molybdena-alumina catalysts generally contain between about 5 weight percent and about 20 weight percent molybdena, based on the weight of the catalyst, and preferably between about 8 and about 12 weight percent. The catalyst can be in the form of granules of any size or shape ordinarily used for catalytic materials, i. e., in the form of rods, pellets, spheroids, etc. Particle size of the catalyst is usually between about 4 mesh and about 12 mesh.

In the process of this invention, the conditions of temperature, time, and pressure are related and critical. It is desirable to effect maximum yield with a minimum of coke formation. This can be achieved by varying the reaction conditions within the ranges set forth hereinafter.

Generally, the process of this invention is carried out at temperatures of between about 1000° F. and about 1150° F., and preferably at between about 1050° F. and about 1150° F. At temperatures of about 1200° F., it has been found that only a small amount of liquid products were obtained and that coke and gas were the principal products. When operating below about 1000°

F., on the other hand, disproportionation is a significant reaction.

The contact time of the present process is dependent upon the temperature and the pressure. In general, it varies indirectly with the temperature and directly with the pressure. The contact time can be between about 40 seconds and about 1000 seconds, preferably between about 100 seconds and about 500 seconds.

The present process is conducted in the presence of hydrogen under superatmospheric pressures. Hydrogen can be supplied to the reaction vessel in the form of relatively pure hydrogen gas, or of a gas rich in hydrogen, such as certain refinery overhead gases. The hydrogen gas can also be formed in situ, under the conditions within the reaction vessel, from light hydrocarbons which decompose to form hydrogen, such as, for example, butane, propane, cyclohexane, and the like. The molar proportion of hydrogen to methylbenzenes can vary between about 0.5:1, respectively, and about 10:1 respectively, and preferably between about 1:1, respectively, and about 5:1, respectively. The pressure of the hydrogen gas can be between about 50 pounds per square inch gauge and about 2000 pounds per square inch gauge, preferably between about 100 and about 1000 pounds per square inch gauge. All other conditions remaining constant, the optimum conversions are obtained in the present process under higher hydrogen pressures. In practice, however, the greater technical advantages of high pressures must be balanced against the economic factors involved in the use of extremely high pressure reaction.

The process of this invention can be operated in any reaction vessel adapted for conducting catalytic reactions under superatmospheric pressures. The process, of course, can be carried out batchwise. It is preferable, however, to employ a continuous process wherein undemethylated methylbenzenes or partially demethylated methylbenzenes can be recycled. The catalyst bed can be a fixed bed or a moving bed. When using a moving bed, the hydrocarbon flow can be concurrent or countercurrent with the catalyst bed. The reaction products can be separated by any of the well-known methods for separating liquid products, such as, for example, by fractional distillation.

The following specific examples are for the purpose of demonstrating the process of this invention and the best methods of operation thereof. It must be strictly understood that this invention is not to be limited to the specific reactants and the specific conditions used in the examples, or to the operations and manipulations involved therein. A wide variety of other reactants and conditions, set forth hereinbefore, can be used, as those skilled in the art will readily understand.

RUNS USING A CHROMIA CATALYST

*Example 1*

Toluene was subjected to demethylation by contacting it with a chromia catalyst, at 1100° F., at a liquid hourly space velocity of 0.24, and in the presence of hydrogen gas in a molar proportion of 2.7 moles of hydrogen per mole of toluene, under a pressure of 800 pounds per square inch, gauge. The catalyst used was a coprecipitated chromia-alumina bead catalyst, containing about 32 percent $Cr_2O_3$ by weight. Pertinent data and results of this run are set forth in Table I.

*Example 2*

Toluene was subjected to demethylation under the same conditions employed in Example 1, using the same type of catalyst, except that the space velocity was decreased to 0.12. Pertinent data and results therefor are set forth in Table I.

*Example 3*

Toluene was demethylated by contacting it with the chromia-alumina catalyst described in Example 1, at 1100° F., at a space velocity of 0.24, and in the presence of hydrogen gas in a molar proportion of 3.1 moles of hydrogen per mole of toluene, under a pressure of 400 pounds per square inch, gauge. Pertinent data and results are set forth in Table I.

*Example 4*

Toluene was demethylated as described in Example 3, except that a space velocity of 0.12 was used. Pertinent data and results are set forth in Table I.

*Example 5*

Toluene was demethylated at a temperature of 1100° F., at a space velocity of 0.12, and in the presence of hydrogen gas in a molar proportion of 1.9 moles of hydrogen per mole of toluene, under a pressure of 400 pounds per square inch, gauge. The catalyst used in this run was of the type described in Example 1, but which had been reduced in activity by being subjected to about 459 cycles in a reforming unit. Pertinent data and results are set forth in Table I.

*Example 6*

Toluene was demethylated at a temperature of 1100° F., at a space velocity of 0.24, and in the presence of hydrogen gas in a molar proportion of 2.4 moles of hydrogen per mole of toluene and under a pressure of 100 pounds per square inch, gauge, using the catalyst described in Example 1. Pertinent data are set forth in Table I.

*Example 7*

Toluene was demethylated under the conditions described in Example 4, except that the temperature was increased to 1150° F. Pertinent data and results are set forth in Table I.

*Example 8*

Xylene was demethylated to toluene and benzene by contacting it with the chromia-alumina catalyst of Example 1, at a temperature of 1100° F., at a space velocity of 0.24, and in the presence of hydrogen gas in a molar proportion of 2.5 moles of hydrogen per mole of xylene, under a pressure of 800 pounds per square inch, gauge.

RUNS USING MOLYBDENA CATALYST

*Example 9*

Toluene was demethylated by contacting it with a molybena-alumina catalyst containing 10 percent $MoO_3$, by weight, at a temperature of 1100° F., at a space velocity of 0.24, and in the presence of hydrogen gas in a molar proportion of 2.7 moles of hydrogen per mole of toluene, under a pressure of 400 pounds per square inch, gauge. Pertinent data and results of this run are set forth in Table I.

*Example 10*

Toluene was subjected to demethylation under the conditions described in Example 9, except that the temperature was 1020° F. Pertinent data and results are set forth in Table I.

*Example 11*

Toluene was contacted with the catalyst described in Example 9, at a temperature of 1200° F., at a liquid hourly space velocity of 0.266, and in the presence of hydrogen gas in a molar proportion of 2.5 moles of hydrogen per mole of toluene, under a pressure of 400 pounds per square inch, gauge. The amount of demethylation achieved under these conditions was nil. The total amount of liquid products, including toluene, benzene and xylene, was only about 8 weight percent. Pertinent data and results are set forth in Table I.

TABLE I

| Ex. | Hydro-carbon charged | Cat-alyst | Temp., °F. | Pres-sure, p.s.i.g. | Moles H₂/mole hydro-carbon | Con-tact time, sec. | Liquid hourly space veloc-ity | Weight percent per pass | | | | | | Ultimate weight percent | | | | |
|---|---|---|---|---|---|---|---|---|---|---|---|---|---|---|---|---|---|---|
| | | | | | | | | Ben-zene | Tol-uene | Xy-lenes | Tri-methyl-ben-zenes | Coke | Gas | Ben-zene | Xy-lenes | Tri-methyl-ben-zenes | Coke | Gas |
| 1 | Toluene | (¹) | 1,100 | 800 | 2.7 | 331 | 0.24 | 61.7 | 21.6 | 0.22 | 0.03 | 0.5 | 9.6 | 85.5 | 0.45 | 0.1 | 0.7 | 13.3 |
| 2 | do | (¹) | 1,100 | 800 | 2.9 | 157 | 0.12 | 59.2 | 11.6 | 0.28 | 0.02 | 0.3 | 17.7 | 76.4 | 0.36 | 0.03 | 0.4 | 22.8 |
| 3 | do | (¹) | 1,100 | 400 | 3.1 | 153 | 0.24 | 30.3 | 62.6 | 0.2 | | 0.2 | 7.9 | 78.4 | 0.6 | | 0.6 | 20.4 |
| 4 | do | (¹) | 1,100 | 400 | 2.8 | 81 | 0.12 | 61.2 | 22.0 | 0.22 | | 1.2 | 11.2 | 83.0 | 0.3 | | 1.6 | 15.2 |
| 5 | do | (⁴) | 1,100 | 400 | 1.9 | 678 | 0.12 | 60.6 | 22.4 | 0.2 | | 0.4 | 16.75 | 77.4 | 0.3 | | 0.5 | 21.4 |
| 6 | do | (¹) | 1,100 | 100 | 2.4 | 45 | 0.24 | 19.6 | 74.5 | 0.5 | | 1.0 | 6.5 | 71.0 | 1.9 | | 3.8 | 23.4 |
| 7 | do | (¹) | 1,150 | 400 | 2.7 | 80 | 0.12 | 58.4 | 8.1 | 0.23 | | 7.9 | 18.5 | 68.8 | 0.27 | | 9.3 | 21.7 |
| 8 | Xylene | (¹) | 1,100 | 800 | 2.5 | 403 | 0.24 | 7.1 | 30.3 | 46.4 | 0.1 | 0.03 | 7.3 | 15.9 | ³67.5 | 0.2 | 0.1 | 16.3 |
| 9 | Toluene | (²) | 1,100 | 400 | 2.7 | 165 | 0.24 | 45.6 | 20.6 | 0.7 | | 4.3 | 23.3 | 61.6 | 0.9 | | 5.8 | 31.6 |
| 10 | do | (²) | 1,020 | 400 | 2.5 | 183 | 0.24 | 12.8 | 77.4 | 3.0 | 0.13 | 1.0 | 4.0 | 61.6 | 14.2 | 0.6 | 4.7 | 19.0 |
| 11 | do | (²) | 1,200 | 400 | 2.5 | 128 | 0.266 | | ⁵8 | | | 37 | 55 | | | | | |

¹ Chromia-alumina catalyst containing about 32% Cr₂O₃ by weight.
² Molybdena-alumina catalyst containing about 10% MoO₃ by weight.
³ Yield is weight percent toluene from xylene.
⁴ Chromia-alumina catalyst containing about 32% Cr₂O₃ by weight, subjected to 459 cycles in a reforming unit.
⁵ Total liquid products.

It will be apparent from the foregoing examples that demethylation of methyl-substituted benzenes is readily effected in the presence of chromia or molybdena catalysts, with a minimum of coking. At temperatures below about 1000° F., the disproportionation reaction becomes more predominant (note Example 8, wherein disproportionation becomes evident, although demethylation is still the primary reaction). At temperatures of the order of about 1200° F. (Example 11), however, degradation occurs, at least under the conditions employed. It is conceivable that demethylation can be effected at these temperatures, if a shorter contact time and a higher hydrogen pressure are employed. It is believed, however, that temperatures of this magnitude approach the limits of the present process. The conditions set forth in Examples 1 and 4 represent two optimum sets of conditions found. It will be noted that the conversion of 85 percent to benzene represents an actual yield of 100 percent of the theoretical yield. The theoretical conversion from toluene to benzene is 85 weight percent benzene and 15 weight percent methane. It will be recognized that, in the case of xylene (Example 8), the ultimate yield (67.5 percent) of toluene can be converted to benzene by recycling, if larger amounts of benzene are desired.

Although the present invention has been described in conjunction with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for demethylating methyl-substituted benzenes into other benenoid hydrocarbons, which comprises contacting the methyl-substituted benzene with a catalyst selected from the group consisting of (1) chromia supported on alumina and containing between about 4 weight percent and about 12 weight percent chromia, (2) chromia cogelled with alumina and containing between about 18 mole percent and about 80 mole percent chromia, and (3) molybdenum oxide-alumina containing between about 5 weight percent and about 20 weight percent molybdenum oxide, at a temperature of between about 1000° F. and about 1150° F., for a contact time of between about 40 seconds and about 1000 seconds, and in the presence of hydrogen gas under pressures of between about 50 pounds per square inch gauge and about 2000 pounds per square inch gauge.

2. A process for demethylating methyl-substituted benzenes, which comprises contacting the methyl-substituted benzene with a catalyst comprising supported chromia containing between about four percent and about 12 percent chromia, by weight, at a temperature of between about 1050° F. and about 1150° F., for a contact time of between about 100 seconds and about 500 seconds, and in the presence of hydrogen gas under a pressure of between about 100 pounds per square inch gauge and about 1000 pounds per square inch gauge.

3. A process for demethylating methyl-substituted benzenes, which comprises contacting the methyl-substituted benzene with a cogelled chromia-alumina catalyst containing between about 18 mole percent and about 40 mole percent chromia, at a temperature of between about 1050° F. and about 1150° F., for a contact time of between about 100 seconds and about 500 seconds, and in the presence of hydrogen gas under a pressure of between about 100 pounds per square inch gauge and about 1000 pounds per square inch gauge.

4. A process for demethylating toluene, which comprises contacting toluene with a cogelled chromia-alumina catalyst containing about 32 weight percent chromia, at a temperature of about 1100° F., for a contact time of about 331 seconds, and in the presence of hydrogen gas under a pressure of about 800 pounds per square inch gauge.

5. A process for demethylating toluene, which comprises contacting toluene with a cogelled chromia-alumina catalyst containing about 32 weight percent chromia, at a temperature of about 1100° F., for a contact time of about 81 seconds, and in the presence of hydrogen gas under a pressure of about 400 pounds per square inch gauge.

6. A process for demethylating xylene, which comprises contacting xylene with a cogelled chromia-alumina catalyst containing about 32 weight percent chromia, at a temperature of about 1100° F., for a contact time of about 403 seconds, and in the presence of hydrogen gas under a pressure of about 800 pounds per square inch gauge.

7. A process for demethylating methyl-substituted benzenes, which comprises contacting the methyl-substituted benzene with a molybdenum oxide-alumina catalyst containing between about five weight percent and about 20 weight percent molybdenum oxide, at a temperature of between about 1050° F. and about 1150° F., for a contact time of between about 100 seconds and about 500 seconds, and in the presence of hydrogen gas under a pressure of between about 100 pounds per square inch gauge and about 1000 pounds per square inch gauge.

8. A process for demethylating toluene, which comprises contacting toluene with a molybdenum oxide-alumina catalyst containing about 10 percent, by weight, of molybdenum oxide, at a temperature of about 1100°

F., for a contact time of about 165 seconds, and in the presence of hydrogen gas under a pressure of about 400 pounds per square inch gauge.

References Cited in the file of this patent

UNITED STATES PATENTS

| | | |
|---|---|---|
| 2,386,969 | Mattox | Oct. 16, 1945 |
| 2,396,761 | Tilton | Mar. 19, 1946 |
| 2,632,779 | Pfennig | Mar. 24, 1953 |
| 2,692,293 | Heinemann | Oct. 19, 1954 |

FOREIGN PATENTS

| | | |
|---|---|---|
| 637,595 | Great Britain | May 24, 1950 |
| 695,273 | Germany | July 25, 1940 |

OTHER REFERENCES

Ipatieff: Jour. Am. Chem. Soc., vol. 55, pages 3696–3701 (6 pages; September 1933).